United States Patent
Zabawskyj et al.

(10) Patent No.: US 7,809,380 B2
(45) Date of Patent: * Oct. 5, 2010

(54) METHOD AND SYSTEM FOR PRESENCE DETERMINATION OF MOBILE DEVICES

(75) Inventors: Bohdan Zabawskyj, Woodbridge (CA); Rubens Rahim, Markham (CA)

(73) Assignee: Redknee Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/393,211

(22) Filed: Feb. 26, 2009

(65) Prior Publication Data

US 2009/0247154 A1    Oct. 1, 2009

Related U.S. Application Data

(60) Continuation of application No. 11/399,437, filed on Apr. 7, 2006, now Pat. No. 7,515,919, which is a division of application No. 10/252,921, filed on Sep. 10, 2002, now abandoned.

(51) Int. Cl.
*H04W 24/00* (2009.01)
(52) U.S. Cl. .............. 455/456.3; 455/433; 455/432.1
(58) Field of Classification Search .............. 455/456.3, 455/433, 432.1
See application file for complete search history.

(56) References Cited

U.S. PATENT DOCUMENTS

| | | | |
|---|---|---|---|
| 5,889,839 A | 3/1999 | Beyda | |
| 6,058,303 A | 5/2000 | Angstrom | |
| 6,178,322 B1 | 1/2001 | Creech | |
| 6,311,057 B1 | 10/2001 | Barvesten | |
| 6,405,035 B1 | 6/2002 | Singh | |
| 6,430,604 B1 | 8/2002 | Ogle | |
| 6,667,963 B1 | 12/2003 | Rantalainen | |
| 7,515,919 B2 * | 4/2009 | Zabawskyj et al. | 455/456.3 |
| 2002/0007397 A1 | 1/2002 | Ouzounidis et al. | |
| 2003/0018704 A1 | 1/2003 | Polychronidis et al. | |
| 2008/0119204 A1 | 5/2008 | Hines et al. | |

* cited by examiner

*Primary Examiner*—Patrick N Edouard
*Assistant Examiner*—Justin Y Lee
(74) *Attorney, Agent, or Firm*—T. Andrew Currier; Stephen J. Perry; Perry + Currier Inc.

(57) ABSTRACT

A presence server for determining presence of a mobile station in a mobile network, including structure and/or function to: receive a request for a presence indication that the mobile station is active; send a first query into the mobile network based on the request; receive a response to the first query; and, if the response indicates the mobile station is active then: provide the presence indication; if the response indicates the mobile station is not active then: send a second query into the mobile network for establishing a notification trigger; receive a second query response based on the notification trigger; the second query response including the presence indication and being based on short message service ("SMS"); and provide the presence indication based on the second query response.

9 Claims, 2 Drawing Sheets

— TRANSPORT FACILITY (E.G. ISDN, E1/T1)
……… SIGNALLING FACILITY (E.G. SS7, SCTP, SIP)
---- TCP/IP OR X.25

METHOD AND SYSTEM FOR PRESENCE DETERMINATION OF MOBILE DEVICES

PRIORITY CLAIM

The present application is a continuation of U.S. patent application Ser. No. 11/399,437, filed Apr. 7, 2006, now U.S. Pat. No. 7,515,919, which is a divisional of U.S. patent application Ser. No. 10/252,921, filed on Sep. 10, 2002 (abandoned), the contents of both incorporated herein by reference.

BACKGROUND ART

The concept of presence is becoming increasingly important with respect to the provision of a number of new compelling services including instant messaging and chat groups to provide an enhanced wireless user experience. U.S. Pat. No. 6,405,035 to Singh, entitled System and Method for Forwarding Messages to a Subscriber Device and U.S. Pat. No. 6,430,604 to Ogle et al., entitled Technique for Enabling Messaging Systems to use Alternative Message Delivery Mechanisms, for instance detail the relevant art.

However, the determination of a given wireless subscriber's presence status is difficult to ascertain in a mobile environment. Existing methods for determining a mobile subscriber's presence involve periodic polling mechanisms whereby the identifier of the mobile subscriber's mobile station is queried periodically in order to ascertain the presence of the said subscriber (i.e. whether the mobile station is on or off). U.S. Pat. No. 5,889,839 to Beyda et al., entitled System and method for providing Automated Message Notification in a Wireless Communication System, remains illustrative of that art. And indeed, while periodic polling mechanisms may work effectively for a small number of subscribers, the number of aggregate queries associated with large numbers of such subscribers (as, in the millions) will materially affect the operation of critical network elements in the mobile network such as the Home Location Register (HLR). Effectively precluding the efficacy of such mechanisms for the determination of presence where again large numbers of subscribers (including the entire subscriber base of a given mobile network) may be concerned.

Alternative mechanisms for determining presence involve the development of an application which is either installed or downloaded into a suitably equipped mobile station. The application resident in the mobile station would in turn notify a centralized presence server via a messaging sequence which is transported via a suitably supported air interface and network protocols at specific points in time (for example, when the mobile station is turned on). While the latter alleviates issues juxtaposed with a large number of queries associated with the period polling mechanisms, the lack of mobile stations which are suitably equipped with sufficient processing power and memory, in addition to operating systems which are conducive to the operation of supplementary applications on them as such, have precluded the widespread adoption of the mobile station application based mechanism for presence determination.

A third mechanism for determining presence involves the monitoring of communication links, typically Signalling System 7 (SS7) links, which carry messages necessary for the continued operation of mobility networks. Passive devices are typically installed on SS7 links to monitor for various mobility management messages which infer whether a given mobile subscriber is active or inactive. And, while the mechanism of inferring presence does not involve the injection of messages into a given network, it does involve a considerable outlay of infrastructure to facilitate the monitoring of the appropriate number of SS7 links. Additionally, for some scenarios the passive monitoring of mobility management messages may not provide an accurate indication of whether the phone has been deactivated (for example, in the scenario whereby the battery is removed from the mobile station).

U.S. Pat. No. 6,058,303 to .ANG.strom et al., entitled System and Method for Subscriber Activity Supervision, details art akin to that disclosed herein however the disclosed means of implantation is restricted to a GSM-based PLMN system. And additionally in consideration of the fact that it remains central to the scope and intent of the present invention to disclose a system and method which minimizes impact to the network infrastructure over and above that referred to in the former, and indeed the state of the art in general. As an example, the art disclosed by .ANG.strom et al., requires the use of a SMS-C in order to initiate a "SMS-probe" while the are disclosed herein does not make use of the SMS-C to invoke a notification trigger. Therefore, the technical means of implementation remain materially dissimilar to anyone versed thereof.

U.S. Pat. No. 6,178,322 to Creech, entitled Message waiting notification using ANSI-41 network messaging protocols provides art relating to the establishment of a message waiting notification capability between a given network node and the HLR. However, the disclosed art does not utilize existing messaging operations and parameters (as provided in IS-841 by means of example) and therefore requires the development and support of incremental messaging operations and parameters which may not be supported by existing core network infrastructure (e.g. HLRs).

REFERENCES CITED

| U.S. patent application | | | |
| --- | --- | --- | --- |
| U.S. Pat. No. 6,430,604 | August 2002 | Ogle et al. | G06F13/00 |
| U.S. Pat. No. 6,405,035 | June 2002 | Singh | H04M3/42 |
| U.S. Pat. No. 6,178,322 | January 2001 | Creech | H04M011/10 |
| U.S. Pat. No. 6,058,303 | May 2000 | ANG.strom et al. | H04Q7/22 |
| U.S. Pat. No. 5,889,839 | March 1998 | Beyda et al. | H04Q7/22; H04M3/50 |

OTHER REFERENCES

GSM 03.40, Digital cellular telecommunications system (Phase 2+); Technical realization of the Short Message Service (SMS)

GSM 09.02, Mobile Application Part (MAP) specification b 3GPP2 N.S0023, Network Support for MDN-Based Message Centers TIA TR 45.2, IS-841, TIA/EIA-41-D Based Network Enhancements for MDN Based Message Centers TLA/EIA ANSI-41. Cellular Radiotelecommunications Intersystem Operations

TECHNICAL FIELD

The present invention relates to telecommunication network implementations, and, in particular, to a method and system of determining the presence of mobile devices in a mobile network via signalling procedures and operations associated with the provision of messaging services.

SUMMARY OF THE INVENTION

A method for determining the presence of wireless devices in a mobile network via signalling procedures and operations associated with the provision of messaging services is disclosed.

The invention utilizes existing functionality associated with the delivery of Short Message Services (SMS) in an innovative manner to provide for an effective means of determining the presence of a mobile station in a mobile network. Existing SMS methods and procedures provide for a mechanism whereby the Short Message Service Center (SMS-C) is notified in the event that a given message cannot be delivered to a mobile station. Procedures associated for the delivery of SMS messages provide for a number of procedures whereby the SMS-C is notified in the event that a subscriber is unavailable (for example, when the mobile subscriber has turned off the mobile station). These procedures are described in existing standards and specifications, as for instance, GSM 03.40 and 3GPP2 N.S0024 as amended from time to time. The invention emulates a SMS-C for the purpose of establishing a notification trigger in the applicable network element (typically the Home Location Register or Mobile Switching Center) in the event that the presence algorithm determines that the mobile station is inactive.

In one, non-exhaustive embodiment of the invention, a Presence Server will receive a query from an external application for the purpose of determining if a given mobile subscriber is active. The Presence Server will in turn initiate a query in order to determine whether a mobile station is inactive or active. The method of determining whether a mobile station is inactive or not will vary depending on the nature of the mobile network. For example, whether the core network structure is based on the architecture and operational processes defined by the Global System for Mobile communication (GSM) or American National Standards Institute (ANSI) specifications and standards. These methods typically involve a query to the HLR and/or the MSC in order to determine the status of the mobile station. A specific example used in the case of networks used in GSM compatible networks is the use of the Any Time Interrogation (ATI) query which is directed to the HLR. Should it be determined that a mobile station is inactive, the Presence Server emulates a SMS-C for the purpose of establishing a notification trigger in the applicable network element (typically the Home Location Register or Mobile Switching Center). Once the mobile station is reactivated (for example, the mobile subscriber turns the mobile station on), the core network infrastructure notifies the Presence Server of the reactivation of the mobile station using the procedures and operations associated with the delivery of SMS messages.

The invention therefore provides for a mechanism of mitigating the number of queries required to determine presence as the mobile station is not queried on a periodic basis if it has been determined that the mobile station is inactive. As the invention relies on basic mobility management procedures and operations defined by the GSM and ANSI specifications, the invention furthermore does not require any special applications to be installed on mobile stations or any retrofits to mobile stations. Indeed, the invention may be used on the overwhelming majority of existing handsets without any modification. Furthermore, the invention utilizes the existing network infrastructure and capabilities associated with SMS services without a material modification or outlay of incremental infrastructure.

A number of modifications and permutations are possible without diluting the material aspects of the invention. For example, the presence server may include a temporary repository (a cache) of recent queries in order to further limit the impact of presence requests of applications.

These features and other such advantages of the present invention shall readily become apparent from the following description and accompanying drawings.

DETAILED DESCRIPTION OF THE PREFERRED EMBODIMENTS

Figure 1:
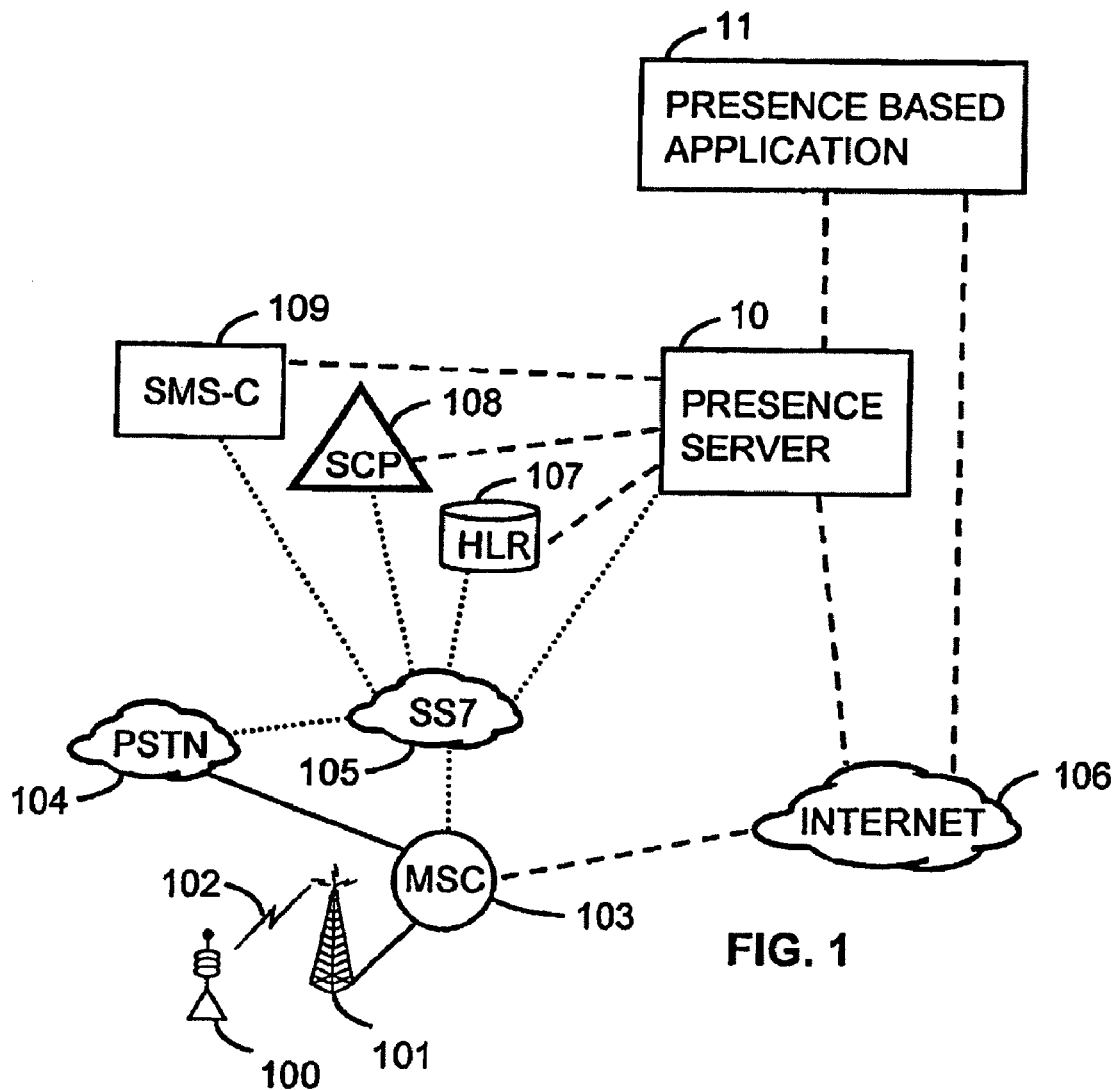
FIG. 1 illustrates the configuration of the presence determination method and system in a sample telecommunications system in accordance with a non-limiting embodiment of the present invention.

Referring to FIG. 1, the configuration of the Presence Server 10 in an example telecommunications system is illustrated in a block diagram. Members skilled in the art will appreciate that the illustrated network elements do not represent all of the physical nodes used to realize a public mobile telecommunications network. Indeed, those members shall also recognize that additional transport and signalling facilities may be utilized in order to establish connectivity among the network elements as generally described in standards and specifications including, but not limited to, ANSI-41 and GSM 9.02. Detailed depictions of well known architectures and network configurations are omitted so as not to obscure the art of the present invention with superfluous detail.

Again referring to FIG. 1, the SS7 105 network provides signalling connectivity among a number of network elements in the public network including Mobile Service Centers 103, SMS-Cs 109, Service Control Points (SCPs) 108, and HLRs 107. Signalling connectivity can also be provided by other protocols including the Stream Control Transmission Protocol (STCP) and Session Initiation Protocol (SIP) specified by the Internet Engineering Task Force (IETF). The MSC 103 provides for a source and sink of communications traffic as the MSC serves mobile stations 100. MSCs 103 serve mobile stations 100 via base stations 101 and radio links 102. The connectivity between the mobile station and a given destination point such as another mobile station (not shown) a fixed station (not shown) is provided via the MSC 103 which in turn provides SS7 connectivity and transport connectivity via the Public Switched Telephone Network (PSTN) 104. Those skilled in the art will appreciate that the mobile station may also be provided with data connectivity to applications generally accessible via data networks including, but not limited to, the internet, via other network elements not shown in FIG. 1 including Packet Data Serving Nodes (PDSN) and General Packet Radio Service (GPRS) nodes which are associated with ANSI oriented and GSM oriented networks respectively.

With reference again FIG. 1, the Presence Server 10 has direct or indirect connectivity to the network elements of the mobile network including, but not limited to, the MSC 103, HLR 107, SCP 108, SMS-C 109 using industry standard protocols such as SS7, X.25, SIP, or TCP/IP. A Presence Based Application 11 has direct or indirect connectivity to the Presence Sever using industry standard data protocols such X.25, SIP, or TCP/IP.

With reference to FIG. 1, the Presence Server will generally contain provisioned subscriber identifiers which may include the subscriber's Mobile Station Integrated Services Digital Network Number (MSISDN) or Mobile Directory Number (MDN) or Network Address Identifier (NAI). The Presence Server will generally contain provisioned application identifiers which may include an alphanumeric string of digits which uniquely identify a given application. Both the provisioned subscriber identifiers and application identifiers may in turn be associated with a provisioned profile. In the case of the subscriber identifier, the provisioned profile may contain attributes associated with the efficient provision of presence services including but not limited to a list of the subscriber's explicitly approved and disallowed applications, and the subscriber's preferences with respect the treatment of queries from applications other than the subscriber's explicitly approved and disallowed applications. In the case of the application identifier, the provisioned profile may include attributes with respect to the relative priority of the application, the number of queries which may be permitted per period of time, and the default treatment to be accorded to presence queries in the event that a given subscriber does not explicitly authorize or deny access to his/her presence status. Those skilled in the art will recognize that a variety of methods may be utilized to initialize or modify either the subscriber or application profiles including, but are by no means bounded by, Internet browser, voice-based call using speech-to-text technologies, and/or voice-based call using Dual-Tone-Multi-Frequency (DTMF) Interactive Voices Response based technologies.

Figure 2:
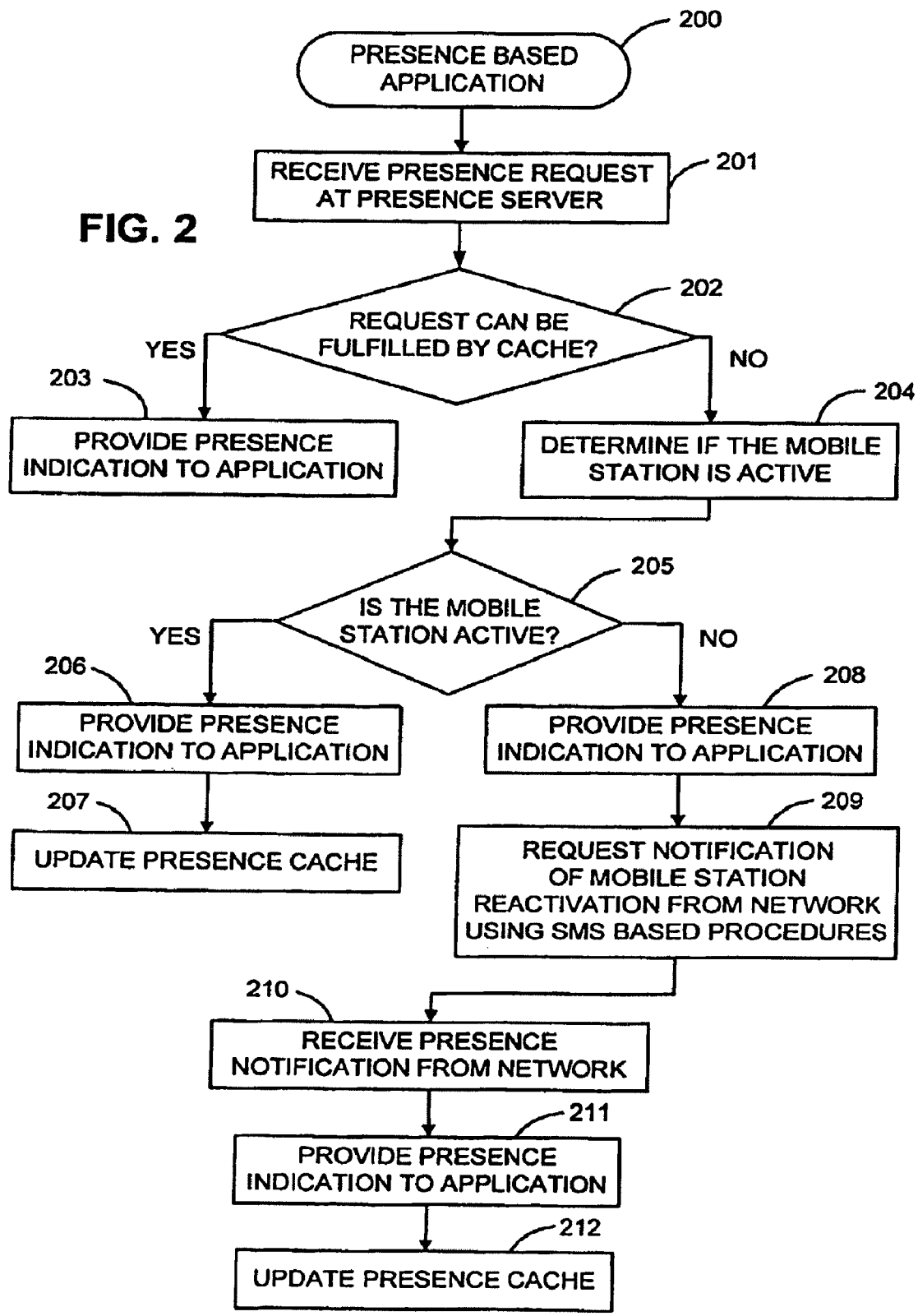
FIG. 2 illustrates a flow diagram of the presence determination method and system according to an non-limiting embodiment of the present invention.

Referring now to FIG. 2, a flow diagram of the presence determination method and system according to an non-limiting embodiment of the present invention is provided. A Presence Based Application 200 determines that it requires knowledge of a given mobile subscriber's presence information for the provision of a given service. The Presence Based Application 200 therewith registers the subscriber's addressing information with the Presence Server for the purpose of initiating the process of determining the mobile subscriber's presence attribute.

At 201, the request will be received via an Application Programming Interface (API) which will include a number of parameters including but not limited to the application identifier, the subscriber identifier, and a transaction identifier. The purpose of the transaction identifier being to uniquely correlate a given presence request with a response which is generally received asynchronously. Practitioners skilled in the art shall recognize that a variety of object oriented application programming interfaces will serve the purpose of notification without affecting the intent and scope of the present invention. Indeed, such members shall further recognize that the API may be extended to include a presence request for several subscribers simultaneously.

Not shown are any transformational processes which the Presence Server may invoke in order to translate a given subscriber identifier to one or more mobile station identifiers. Those skilled in the art will recognize that a given subscriber may be associated with more than one mobile station and the Presence Server will therefore require a process for mapping a subscriber identifier to the mobile station identifiers associated with the subscriber. Additionally, members skilled in the art will recognize that a number of algorithmic techniques may be utilized for this purpose without affecting the intent and scope of the present invention including but not limited to a database structure or a memory based array indexed via the subscriber identifier.

At 202, the Presence Server determines whether the presence request for a given mobile subscriber can be fulfilled by a previous presence request. Whether the current presence request can be fulfilled by the data in the cache will be based on several factors including but not limited to the profile associated with the application, whether the cache includes any presence data for a mobile station identifier, and the age of the stored presence data. Those skilled in the art will recognize that a number of algorithmic techniques may be utilized for the purpose of maintaining the presence cache including but not limited to a database structure or a memory based array indexed by a mobile station identifier.

If the Presence Server determines that the presence request can be fulfilled by the presence data stored in the cache, at 203, the Presence Server will provide the presence attribute to the Presence Based Application via the presence API. The transaction identifier received in the associated presence query will be utilized to correlate the presence attribute to a previous presence query. In the event that the subscriber is associated with more than one mobile station, presence attributes with each mobile station as well as the associated mobile station identifier or other mobile station attribute (for example, type of mobile station) may be provided by the presence server to the Presence Based Application via the presence API.

If the Presence Server determines that the presence request cannot be fulfilled by a presence data stored in the cache, at 204, the Presence Server will initiate the process in order to actively determine the presence attribute of the mobile station (s) associated with the mobile subscriber identifier.

At 205, the Presence Server will determine the state of the station(s) associated with the mobile subscriber. That is, whether the mobile station(s) can be accessed via the mobile network. In a specific, non exhaustive example of a query mechanism which can be utilized in order to determine the state of a given mobile station, an Any Time Interrogation query may be initiated to a HLR for a GSM compliant network. Similarly, in an alternative and non exhaustive example, a SMSREQ query may be initiated to an HLR for an ANSI-41 compliant network. Those skilled in the art will recognize that a number of alternative query mechanism may be invoked in order to determine the state of the mobile stations(s) associated with a given mobile subscriber without affecting the intent and scope of the present invention.

If the Presence Server determines that the mobile station is active, at 206, the Presence Server will provide the presence attribute to the Presence Based Application via the presence API. The transaction identifier received in the associated presence query will be utilized to correlate the presence attribute to a previous presence query. In the event that the subscriber is associated with more than one mobile station, presence attributes with each mobile station as well as the associated mobile station identifier or other mobile station attribute (for example, type of mobile station) may be provided by the presence server to the Presence Based Application via the presence API.

At 207, the Presence server will update the cache in the Presence Server. Updating the cache at 207 will serve to minimize queries into the network and preserve valuable network resources.

If the Presence Server determines that the mobile station is not active, at 208, the Presence Server may provide the presence attribute to the Presence Based Application via the presence API depending on the nature of the presence request received from the presence based application. The transaction identifier received in the associated presence query will be utilized to correlate the presence attribute to a previous presence query. In the event that the subscriber is associated with more than one mobile station, presence attributes with each mobile station as well as the associated mobile station identifier or other mobile station attribute (for example, type of mobile station) may be provided by the presence server to the Presence Based Application via the presence API.

At 209, the Presence Server will initiate the process of establishing a notification trigger in the applicable network element using the processes and operations associated with the delivery of SMS messages as specified in TIA TR 45.2 IS-841, 3GPP2 N.S0024, GSM 03.40, and GSM 09.02 as amended from time to time. Details associated with well known short message delivery methods and procedures are omitted so as not to obscure the description of the present invention with unnecessary detail. For ANSI-41 compliant networks, the Presence Server will initiate a SMSREQ query to the HLR. The format and content of the SMSREQ query will be consistent with the guidelines specified in TIA TR45.2 IS-841 as amended from time to time with due consideration that the format of the SMSREQ query may be modified in order to meet the specific requirements of the HLR associated with a given mobile station identifier. For GSM compliant networks, the Presence Server will initiate a Report_SM_Delivery_Status message to the HLR. The format and content of the Report_SM_Delivery_Status message will be consistent with the guidelines specified in GSM 09.02 and GSM 03.40 as amended from time to time with due consideration that the format of the SMSREQ query may be modified in order to meet the specific requirements of the HLR associated with a given mobile station identifier. In the case of the Report_SM_Delivery_Status message, the Presence Server will populate the Service Center Address parameter with a E.164 compliant number which will uniquely identify the Presence Server for the purpose of receiving a notification response message from the HLR. In the case of the Report_SM_Delivery_Status message, the Presence Server will also populate the SM Delivery Outcome parameter with a bit sequence which shall mean 'Absent Subscriber'.

At 209, the presence server will initiate the process of establishing a notification trigger for each mobile station identifier associated with a given mobile subscriber identifier. For ANSI-based networks, the SMSREQ query will simultaneously set the notification trigger as well as return the state of the mobile-subscriber. Therefore, for ANSI-based networks, step 209 will implicitly be accommodated in step 205.

At 210, the Presence Server will receive an indication that the mobile station associated with a mobile station identifier is active using the processes and operations associated with the delivery of SMS messages as specified in TIA TR 45.2 IS-841, 3GPP2 N.S0024, GSM 03.40, and GSM 09.02 as amended from time to time. Details associated with well known short message delivery methods and procedures are omitted so as not to obscure the description of the present invention with unnecessary detail. For ANSI-41 compliant networks, a SMS Notification message will be received. The SMS Notification message will contain the mobile station identifier(s) associated with a given mobile station associated with the subscriber as well as a SMSADDR parameter which indicates that contact with the mobile station has been achieved by the mobile network. For GSM compliant networks, a Alert_Service_Centre message will be received. The Alert_Service_Centre message implicitly indicates that contact with the mobile station has been achieved by the mobile network.

Those skilled in the art will recognize that other messages may be received which will not affect the intent and scope of the present invention. As a non-limiting example, for ANSI-41 networks, a SMS Notification message may be received which will indicate that the mobile subscriber could not be contacted by the mobile network. If such a message is received, the Presence Server may either inform the Presence Based Application that the mobile station for a subscriber identifier is inactive or repeat the notification request sequence beginning at step 209 depending on the nature of the presence request received in the Presence API.

At 211, the Presence Server will provide the presence attribute to the Presence Based Application via the presence API. The transaction identifier received in the associated presence query will be utilized to correlate the presence attribute to a previous presence query. In the event that the subscriber is associated with more than one mobile station, presence attributes with each mobile station as well as the associated mobile station identifier or other mobile station attribute (for example, type of mobile station) may be provided by the presence server to the Presence Based Application via the presence API.

At 212, the Presence server will update the cache in the Presence Server. Updating the cache at 212 will serve to minimize queries into the network and preserve valuable network resources.

While the foregoing describes what is considered to be an example embodiment of the invention, it is understood that various modifications may be made therein and that the invention may be implemented in various forms and embodiments, and that it may be applied in numerous applications, only some of which have been described. The claims are intended to cover all such modifications and variations which fall within the true scope of the invention.

What is claimed is:

1. A presence server for a mobile telecommunications network configured to:
   receive a request for a presence indication that said mobile station is active from a presence-based application;
   determine if said mobile station is active using a presence query mechanism;
   receive a presence message responsive to said presence query mechanism representing whether said mobile station is active or inactive;
   terminate further processing if said presence message indicates said mobile station is active;
   establish a notification trigger respective to said mobile station in said mobile network based on said request;
   receive a notification message responsive to said notification trigger from said mobile network, said message representing whether said mobile station is active or inactive; and
   provide contents of said notification message to said presence-based application.

2. The presence server of claim 1 wherein said presence server is further configured to, prior to terminating further processing if said presence message indicates said mobile station is active, provide contents of said presence message to said presence-based application.

3. The presence server of claim 1 wherein said presence query mechanism is generated according to the SS7 protocol.

4. The presence server of claim 1 wherein said mobile telecommunications network is based on the Global System for Mobile Communication ("GSM"); and said presence query mechanism is an Any Time Interrogation query initiated to a home location register ("HLR") within said mobile network.

5. The presence server of claim 1 wherein said presence query mechanism is generated according to the Stream Control Transmission Protocol ("SCTP").

6. A presence server for determining presence of a mobile station in a mobile network, said presence server configured to:

receive a request for a presence indication that said mobile station is active from a presence-based application;

establish a notification trigger respective to said mobile station in said mobile network based on said request, said establishing a notification trigger being based on short message service ("SMS"), said mobile network being based on GSM, said notification trigger being a Report_SM_Delivery Status message initiated to a home location register ("HLR"), and said Report_SM_Delivery Status message including content having formatting that is based, at least in part, on the specification identified as GSM 09.02 and GSM 03.40 as amended from time to time;

receive a notification message responsive to said notification trigger from said mobile network, said message representing whether said mobile station is active or inactive;

provide contents of said notification message to said presence-based application; and in association with said notification trigger, populate a Service Center Address parameter with an E.164 compliant number uniquely, such that said notification message will be received from said HLR and addressed to an entity according to said E.164 compliant number.

7. A presence server for determining presence of a mobile station in a mobile network, said presence server configured to:

receive a request for a presence indication that said mobile station is active from a presence-based application;

establish a notification trigger respective to said mobile station in said mobile network based on said request;

receive a notification message responsive to said notification trigger from said mobile network, said message representing whether said mobile station is active or inactive, said notification message being based on short message service ("SMS"), said mobile network being based on ANSI-41, said notification message being an SMS Notification message, and said SMS Notification message containing an identifier associated with said mobile station and an SMSADDR parameter indicating that communication with said mobile station has been achieved by said mobile network; and provide contents of said notification message to said presence-based application.

8. A presence server for determining presence of a mobile station in a mobile network, said presence server configured to:

receive a request for a presence indication that said mobile station is active;

send a first query into said mobile network based on said request;

receive a first query response to said first query from said network; and, if said first query response indicates said mobile station is active then: provide said presence indication based on said first query response; if said first query response indicates said mobile station is not active then: send a second query into said mobile network for establishing a notification trigger, said second query being based on short message service ("SMS"), said SMS being based on at least one of the specifications identified as TIA TR 45.2 IS-841, 3GPP2 N.S0024, GSM 03.40, and GSM 09.02 as amended from time, said mobile network being based on GSM, said second query being a Report_SM_Delivery_Status message initiated to a home location register ("HLR"), and said Report_SM_Delivery_Status message including content having formatting that is based, at least in part, according to the specification identified as GSM 09.02 and GSM 03.40 as amended from time;

receive a second query response based on said notification trigger; said second query response received from said network and including said presence indication;

provide said presence indication based on said second query response; and in association with said second query, populate a Service Center Address parameter with an E.164 compliant number uniquely, such said second query response will be received from said HLR will be and be addressed to an entity according to said E.164 compliant number.

9. A presence server for determining presence of a mobile station in a mobile network, said presence server configured to:

receive a request for a presence indication that said mobile station is active;

send a first query into said mobile network based on said request;

receive a first query response to said first query from said network; and, if said first query response indicates said mobile station is active then: provide said presence indication based on said first query response; if said first query response indicates said mobile station is not active then: send a second query into said mobile network for establishing a notification trigger;

receive a second query response based on said notification trigger; said second query response received from said network and including said presence indication, said second query response being based on short message service ("SMS"), said mobile network being based on ANSI-41, said second query response being an SMS Notification message, and said SMS Notification message containing an identifier associated with said mobile station associated and an SMSADDR parameter indicating that communication with said mobile station has been achieved by said mobile network; and provide said presence indication based on said second query response.

* * * * *